(12) United States Patent
Kim et al.

(10) Patent No.: US 7,775,054 B2
(45) Date of Patent: Aug. 17, 2010

(54) AIR CONDITIONER

(75) Inventors: In Kyu Kim, Jinhae-si (KR); Ja Hyung Koo, Changwon-si (KR); Sim Won Chin, Seoul (KR); Soo Yeon Shin, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 278 days.

(21) Appl. No.: 11/790,059

(22) Filed: Apr. 23, 2007

(65) Prior Publication Data

US 2008/0087028 A1 Apr. 17, 2008

(30) Foreign Application Priority Data

Oct. 17, 2006 (KR) .................. 10-2006-0100614

(51) Int. Cl.
*F25B 43/02* (2006.01)
(52) U.S. Cl. ............... 62/84; 62/468; 62/470; 62/510
(58) Field of Classification Search ............... 62/470, 62/468, 84, 510
See application file for complete search history.

(56) References Cited

U.S. PATENT DOCUMENTS

| | | | | |
|---|---|---|---|---|
| 4,106,307 | A | * | 8/1978 | Matsuda ............... 62/324.4 |
| 5,094,598 | A | * | 3/1992 | Amata et al. ............ 417/533 |
| 2004/0112082 | A1 | * | 6/2004 | Tanimoto et al. ........... 62/510 |
| 2006/0101845 | A1 | * | 5/2006 | Jeong et al. ............... 62/470 |

FOREIGN PATENT DOCUMENTS

| | | |
|---|---|---|
| CN | 1280284 A | 1/2001 |
| CN | 1690597 A | 11/2005 |
| CN | 1752612 A | 3/2006 |

* cited by examiner

*Primary Examiner*—Cheryl J Tyler
*Assistant Examiner*—Jonathan Koagel
(74) *Attorney, Agent, or Firm*—McKenna Long & Aldridge LLP

(57) ABSTRACT

The air conditioner includes a first and a second heat exchanger, a plurality of compressors, a pipe for uniform distribution of oil, a plurality of oil separators, and an oil return opening. The first heat exchanger performs heat exchange between air of an indoor space and refrigerant to condition the air. The second heat exchanger is connected to the first heat exchanger through a pipe, to perform heat exchange between the refrigerant and water. The plurality of compressors is installed at one side of the second heat exchanger, to compress the refrigerant to a high temperature and a high pressure. The pipe for uniform distribution of oil communicates the plurality of compressors with each other, to guide a flow of oil within the plurality of compressors to flow between the compressors. Each oil separator is provided at an outlet of a respective compressor, to separate oil included in refrigerant discharged from the compressors. The oil return opening guides the oil separated by each of the oil separators to flow into all or any one of the plurality of compressors.

8 Claims, 6 Drawing Sheets

AIR CONDITIONER

This application claims priority from Korean Patent Application 10-2006-0100614, filed Oct. 17, 2006, which is hereby incorporated by reference herein in its entirety.

BACKGROUND OF THE INVENTION

1. Field of the Invention

The present invention relates to a water cooled air conditioner, and more particularly, to a water cooled air conditioner including a plurality of compressors for compressing refrigerant and a plurality of oil separators for filtering oil discharged from the compressors, and having a constitution which allows the oil filtered in the plurality of oil separators to return into all or any one of the plurality of compressors.

2. Description of the Related Art

An air conditioner is a cooling/heating apparatus installed in an indoor space such as an office or a home to cool or heat air of the indoor space. The air conditioner uses a repeating refrigerating cycle made up of compression, condensation, expansion, and evaporation operations. The air conditioner discharges heat of condensation or heat of evaporation into an outdoor space generally using air of the outdoor space.

Generally, an air conditioner includes an indoor unit conditioning the air of the indoor space by exchanging heat with the air of the indoor space and an outdoor unit connected to the indoor unit through a pipe, in which refrigerant exchanges heat with outdoor air. Also, an indoor heat exchanger in which the air of the indoor space exchanges heat with the refrigerant is provided in the indoor unit, and an outdoor heat exchanger in which a compressor compressing the refrigerant that exchanges heat with the outdoor air is provided in the outdoor unit.

Meanwhile, the compressor compressing the refrigerant to a high temperature and a high pressure is installed in the outdoor unit of the air conditioner. That is, the compressor, having a cylindrical shape with a predetermined diameter, is provided to compress the refrigerant into a high temperature/pressure gaseous state. Also, one or a plurality of compressors are provided in the outdoor unit.

However, when only one compressor compressing the refrigerant into the high temperature and pressure gas is provided, a problem occurs in that the compressor (having a limited compressing capacity) is damaged by an operation overload when conditioning air of the indoor space. Also, excessive load in the compressor reduces the operating lifespan of the compressor.

Also, oil flow between the compressors does not occur when a plurality of compressor are used. That is, an oil separator, which returns oil discharged from the compressors, is installed in one side of each of the compressors, and the oil separated in each of the oil separators is returned into each of the compressors through a return pipe.

Therefore, the oil discharged from each of the compressors is returned into each of the compressors and oil flow between the compressors does not occur.

Thus, because each of the compressors is operated at a different capacity, an oil shortage occurs in any one compressor having a larger capacity and an oil surplus occurs in another compressor having a smaller capacity.

When the oil shortage of the compressor occurs, the compressor is damaged during operation of the compressor. Also, servicing costs increase and product reliability decreases if the compressor is damaged.

SUMMARY OF THE INVENTION

Accordingly, the present invention is directed to an air conditioner that substantially obviates one or more problems due to limitations and disadvantages of the related art.

An object of the present invention is to provide an air conditioner that allows oil flow between a plurality of its compressors, thereby preventing damage of the compressors.

Another object of the present invention is to provide an air conditioner including a plurality of compressors and an oil separator for separating oil discharged from the compressors, and having a constitution which allows the oil filtered from each of the oil separators to flow into another compressor as well as the discharging compressor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an air conditioner including: a first heat exchanger for performing heat exchange between air of an indoor space and refrigerant to condition the air; a second heat exchanger connected to the first heat exchanger through a pipe, for performing heat exchange between the refrigerant and water; a plurality of compressors installed at one side of the second heat exchanger, for compressing the refrigerant to a high temperature and a high pressure; a pipe for uniform distribution of oil communicating the plurality of compressors with each other, for guiding a flow of oil within the plurality of compressors to flow between the compressors; a plurality of oil separators respectively provided at an outlet of each of the plurality of compressors, for separating oil included in refrigerant discharged from the compressors; and an oil return opening for guiding the oil separated by each of the oil separators to flow into all or any one of the plurality of compressors.

In another aspect of the present invention, there is provided an air conditioner including: a plurality of compressors compressing refrigerant to a high temperature and a high pressure; and a plurality of pipes for uniform distribution of oil communicating the plurality of compressors with each other, for guiding a flow of oil within the plurality of compressors to flow between the compressors, wherein the plurality of pipes for uniform distribution of oil guide oil from within any one compressor to inlets of other compressors from the plurality of compressors.

In a further aspect of the present invention, there is provided an air conditioner including: a plurality of compressors for compressing refrigerant to a high temperature and a high pressure; a plurality of oil separators respectively provided at one side of the plurality of compressors, for separating oil included in refrigerant discharged from the plurality of compressors; and an oil return opening for guiding the oil separated by each of the oil separators to flow into all or any one of the plurality of compressors.

In an air conditioner according to the present invention, a pair of compressors is provided, and an oil return opening and a pipe for uniform distribution of oil are connected to each of the compressors. A pipe for uniform distribution of return oil communicated with an inlet of another compressor is formed in the oil return opening and a return valve selectively opening and closing the pipe for uniform distribution of return oil is installed in the pipe for uniform distribution of return oil. Also, a uniform oil valve selectively opening and closing the pipe for uniform distribution of oil is installed in the pipe for uniform distribution of oil.

Also, in an air conditioner according to the present invention, oil discharged from any one compressor between two compressors can be provided into the discharging compressor and another compressor. Therefore, a suitable oil pressure is attained between the plurality of compressors, thereby preventing an oil shortage due to partiality of oil toward one side of the compressor.

Also, the oil can be uniformly returned into each of compressors by providing a return valve capable of controlling an opening degree of the valve in a pipe for uniform distribution of return oil such that the oil is returned into another compressor. That is, a compressor having a large load capacity can return more oil than a compressor having a small load capacity. Therefore, oil supply according to an amount of oil discharged from each of compressors is possible.

Thus, according to the present invention, the oil can flow among the plurality of compressors, thereby preventing damage of the compressors and also improving product reliability.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

In a multi-type water cooled air conditioner, an indoor unit and an outdoor unit are separately installed, and indoor units are installed respectively in an indoor space to condition the indoor space. Here, the indoor unit and the outdoor unit are connected using a refrigerant pipe. Refrigerant serving as working fluid moves between the indoor unit and the outdoor unit through the refrigerant pipe to condition the indoor spaces.

Meanwhile, in a single unit water cooled air conditioner, an indoor unit and an outdoor unit are not separately installed but are integrated in one body. Also, the indoor spaces and the air conditioner may be connected by ducts. Accordingly, the conditioned air and air of the indoor space flow along this duct to condition the indoor spaces.

Hereinafter, embodiments of a multi-type water cooled air conditioner composed as described above will be described with reference to drawings.

Figure 1:
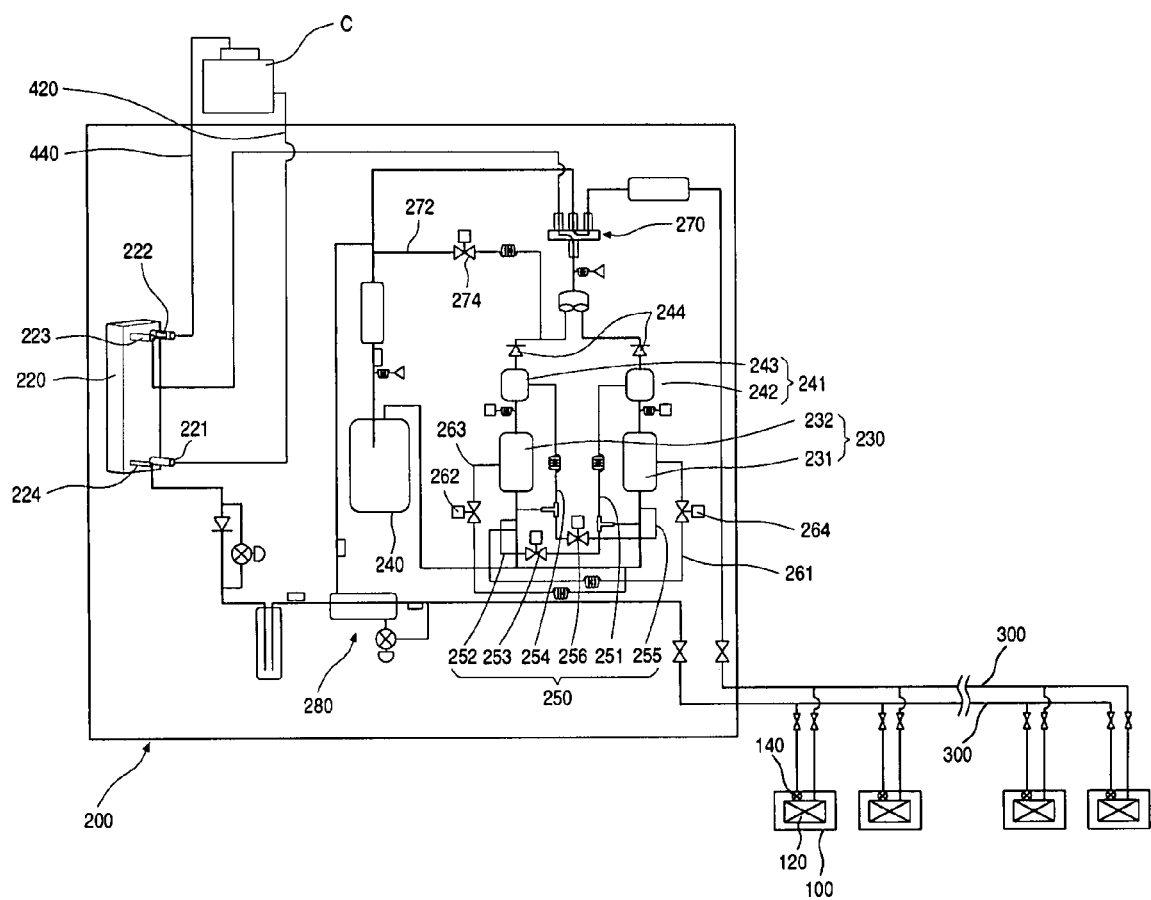
FIG. 1 is a schematic view illustrating a construction of an air conditioner according to a preferred embodiment of the present invention.

FIG. 1 is a schematic view illustrating a construction of an air conditioner according to a preferred embodiment of the present invention.

In a multi-type water cooled air conditioner according to the present invention, indoor units 100 provided within a building are separately installed in a plurality of indoor spaces and an outdoor unit 200 connected by the plurality of indoor units and pipes is installed in another space separated from the indoor spaces where the indoor units 100 are installed.

The indoor units 100 configured to be suitable for the indoor spaces are installed in each of the indoor spaces to condition the indoor spaces. That is, the indoor unit 100 may be embodied in a variety of types such as a standing unit, a wall-mounted unit, a ceiling-mounted unit, etc., and is selectively installed according to a user's needs. The indoor unit 100 communicates with the outdoor unit 200 through a refrigerant pipe 300. Accordingly, the refrigerant pipe 300 guides refrigerant flow between the indoor unit 100 and the outdoor unit 200.

Meanwhile, a cooling tower C cooling water is installed on a roof of the building where the water cooled air conditioner according to the present invention is installed. The cooling tower C cools water by directly contacting the water with air. That is, when the water contacts cool air, a portion of the water is evaporated, thereby dropping the water temperature by absorbing heat required for evaporation from the surrounding air.

The water cooled within the cooling tower C is guided by a water supply pipe 420 and then provided to the outdoor unit 200. The water supply pipe 420 is generally made of a cylindrical pipe. Also, in the cooling tower C, there is installed a water return pipe 440 for guiding water, such that water that is heat exchanged with the refrigerant inside the outdoor unit 200 flows into the cooling tower C. Accordingly, the water cooled in the cooling tower C is guided by the water supply pipe 420 to flow into the outdoor unit 200 and the water heat exchanged with the refrigerant inside the outdoor unit 200 is guided by the water return pipe 440 to flow into the cooling tower C. Then, the water is again cooled in the cooling tower C to again flow into the outdoor unit 200 through the water supply pipe 420, and this procedure is repeated.

A water supply pump (not shown) is further installed in the water supply pipe 420 or the water return pipe 440 to forcefully recycle water between the cooling tower C and the outdoor unit 200 through the water supply pipe 420 and the water return pipe 440.

A first heat exchanger 120, which conditions air in the indoor spaces where the indoor unit 100 is installed by intaking the air in the indoor spaces and performing heat exchanging between the air and the refrigerant, is installed inside the indoor unit 100. The refrigerant serving as working fluid flows within the first heat exchanger 120 and exchanges heat with outside air.

An expansion valve 140 is provided in an entry of the first heat exchanger 120. The expansion valve 140 decompresses pressure of the refrigerant by expanding the refrigerant passing through the expansion valve 140.

The refrigerant pipe 300 for guiding refrigerant flow is connected between the indoor unit 100 and the outdoor unit 200. The refrigerant pipe 300 is divided such that the refrigerant is guided into each of indoor units 100.

Figure 2:
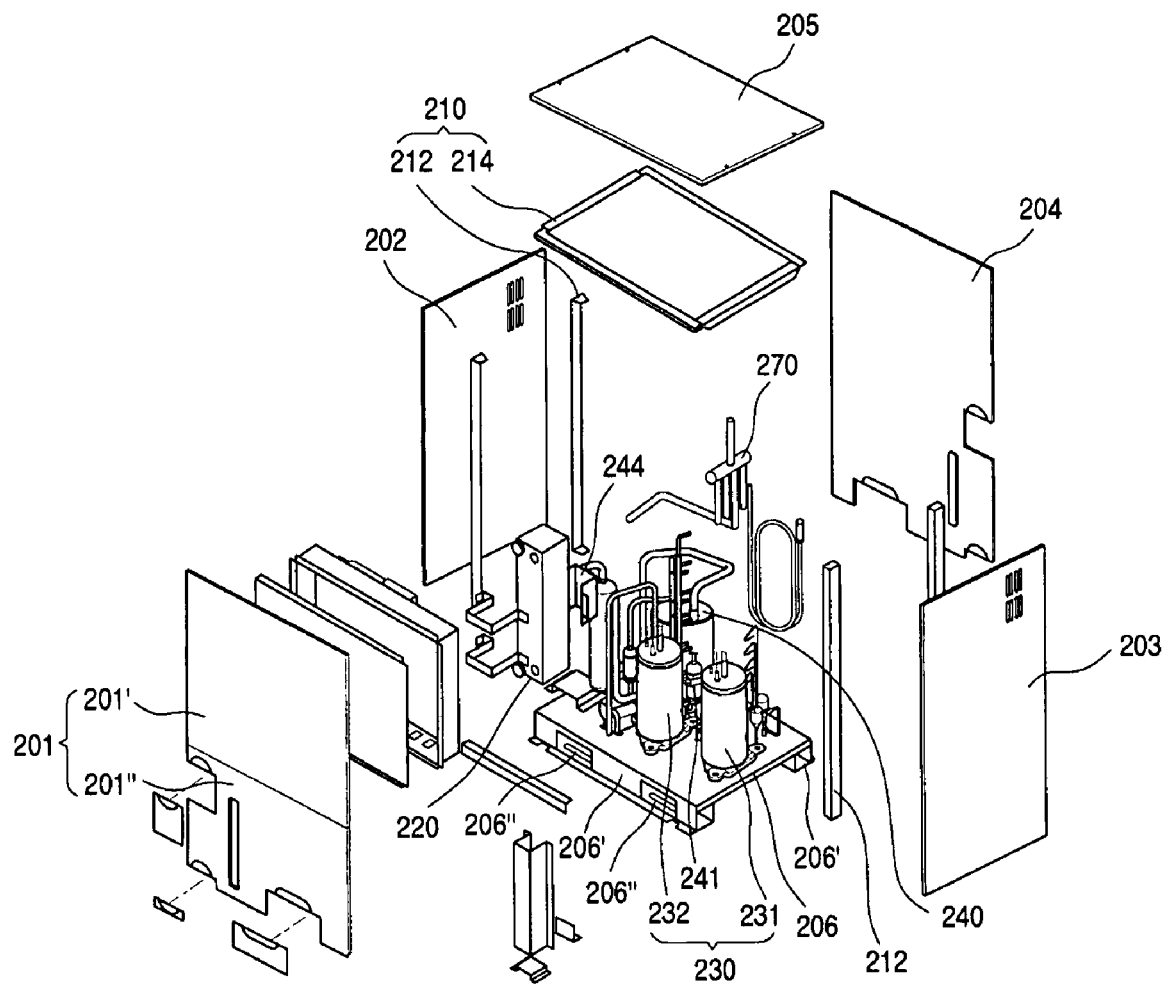
FIG. 2 is an exploded perspective view illustrating an inner construction of an outdoor unit of an air conditioner according to the present invention.

Referring to FIGS. 1 and 2, the constitution of the outdoor unit 200 will be described in detail.

When examining a multi-type water cooled air conditioner outdoor unit 200 with reference to the accompanying drawings, the outdoor unit 200 is connected to the first heat exchanger 120 of the indoor unit 100 by the refrigerant pipe 300, and a construction of the outdoor unit 200 has an approximate external shape that is hexahedral.

The outdoor unit 200 is coupled to a front panel 201 forming a frontal exterior, a left panel 202 forming a left exterior, a right panel 203 forming a right exterior, a rear panel 204 forming a rear exterior, an upper panel 205 forming an upper exterior, and a base 206 forming a bottom exterior, respectively, to form an overall exterior of the outdoor unit 200.

Thus, the outdoor unit 200 forms an inner space having a predetermined size, and a plurality of components for conditioning air of the indoor spaces are installed in the inner space.

The front panel 201 includes a front upper panel 201' installed at the upper portion and a front lower panel 201" installed at a lower portion of the front upper panel 201'. The front panel 201 is divided into the upper panel 201' and the lower panel 201" so as to easily service the inner components.

Also, the front panel 201 and the rear panel 204 are formed in a shape equivalent to each other. Accordingly, the front panel 201 and the rear panel 204 can be positionally switched. Also, the left panel 202 and the right panel 203 are formed in a shape equivalent to each other, thereby also being positionally switchable.

Therefore, the front panel 201 and the rear panel 204, and the left panel 202 and the right panel 203 are formed in a shape equivalent to each other, thereby improving assemblability of the outdoor unit 200 and panel manufacturability to increase production yield.

The base 206 forming the bottom exterior of the outdoor unit 200 is formed in a square plate shape having a predetermined thickness, and a base support 206' is formed in a transverse direction at a front end portion and a rear end portion of the bottom of the base 206.

A fork hole 206" is formed at the base support 206' such that a fork of a forklift can be passed therethrough. The bottom of the base 206 is separated from a ground by a predetermined interval such that moving and transporting the outdoor unit 200 can be easily performed.

Meanwhile, each of the panels forming an outward appearance of the outdoor unit 200 is formed in an approximately square plate shape having a predetermined thickness, and each of the panels is coupled to and supported by the frame 210.

The frame 210 is a component forming a framework of the outdoor unit 200 and includes longitudinal frames 212 extended in an upper direction from each of the edges of an upper surface of the base 206 and transverse frame 214 coupled to upper end portions of the longitudinal frames 212 to connect the upper end portions.

The longitudinal frames 212 are lengthily formed in an upper and lower direction as described in FIG. 2, and each of the panels contacts and is coupled to the longitudinal frames 212.

A second heat exchanger 220 is installed on the upper surface of the base 206 such that refrigerant serving as working fluid is heat exchanged with water. The second heat exchanger 220 has a rectangular hexahedral shape extending in a vertical direction. A plurality of sheet metals is formed within the second heat exchanger 220 such that the sheet metals have a predetermined interval therebetween. The refrigerant and the water are heat exchanged while flowing against each other through spaces among the plurality of sheet metals.

For example, if the refrigerant serving as the working fluid flows from an upper portion to a lower portion at a space formed at the front of the spaces formed among the plurality of sheet metals provided within the second heat exchanger 220, the water flows from a lower portion to an upper portion in a space adjacent to where the refrigerant flows, and the refrigerant flows from an upper portion to a lower portion in a subsequently adjacent space. Accordingly, the refrigerant and the water flow in an opposite direction to allow heat exchange to occur between the refrigerant and the water by heat transmitted through the sheet metals.

A water supply outlet 221, which is a passage where water is supplied into the inner space of the second heat exchanger 220 is protruded frontward at a frontal, lower left side portion thereof. The water supply outlet 221 has a round pipe shape having a predetermined diameter, and an inner space of the water supply outlet 221 communicates with the inner space of the second heat exchanger 220.

A water return inlet 222, which is a passage where water that has exchanged heat with the refrigerant in the inner space of the second heat exchanger 220 flows into the outside of the second heat exchanger 220, is formed at a front upper portion, that is an upper portion of the water supply outlet 221 of the second heat exchanger 220. Preferably, the water return inlet 222 is formed in a shape identical to the water supply outlet 221.

The water supply outlet 221 and the water return inlet 222 are connected to the water supply pipe 420 and the water return pipe 440, respectively.

A refrigerant inlet 223 and refrigerant outlet 224, which are passages where the refrigerant serving as the working fluid flows into the inner space of the second heat exchanger 220 and is discharged into an outer space of the second heat exchanger 220, are formed at one side (left when viewed in FIG. 1) of the water supply outlet 221 and the water return inlet 222, respectively. The refrigerant inlet 223 is formed at a left side of the water return inlet 222, that is a frontal upper left portion, and the refrigerant outlet 224 is formed at a left side of the water supply outlet 221, that is the frontal lower left portion of the second heat exchanger 220. Preferably, the refrigerant inlet 222 and the refrigerant outlet 224 are formed in a shape identical to the water supply outlet 221 and the water return inlet 222, respectively.

A compressor 230 compressing the refrigerant serving as the working fluid into a high pressure and temperature is installed at a right side of the second heat exchanger 220. The compressor 230 has a cylindrical shape having a predetermined height and is provided in a pair. Thus, a high pressure type scroll inverter compressor 231 that operates according to load capacity and compresses refrigerant is installed on the left, and a constant velocity compressor 232 that operates at constant velocity and compresses refrigerant is installed on the right.

The pair of compressors 230 functions selectively according to the load of the indoor space. That is, when the load is low, the inverter compressor 231 is operated, and when the sole operation of the inverter compressor 231 cannot handle an increase in load, the constant velocity compressor 232 is operated. Of course, only the constant velocity compressor 232 can be operated through a user setting. Likewise, even when the inverter compressor 231 cannot handle a load, the inverter compressor 231 can be set to not operate.

A high pressure type scroll compressor for compressing refrigerant to a high pressure is used as the compressor 230 due to its lower noise level and smaller size.

An accumulator 240 is provided at one side of the compressor 230. The accumulator 240 is cylindrical in shape with a predetermined diameter and filters refrigerant in a liquid state from refrigerant flowing into the compressor 230 such that refrigerant in a gaseous state flows into the compressor 230.

When refrigerant which is not vaporized into gas and remains in a liquid state from refrigerant flowing from the outdoor unit 100 flows into the inner space of the compressor 230, load is increased in the compressor 230 that compresses the refrigerant to a gaseous state of a high temperature and a high pressure to cause damage to the compressor 230.

Therefore, the refrigerant flowing into the inner space of the compressor 230 passes through the accumulator 240 to separate the refrigerant in the gaseous state from the refrigerant of the liquid state so that only refrigerant of the gaseous state flows into the inner space of the compressor 230 to compress the refrigerant to the high temperature and pressure.

The refrigerant remaining in the liquid state from the refrigerant flowing into the accumulator 240 is stored at a lower portion of the accumulator 240 because of its heavier weight relative to the refrigerant in the gaseous state, and only the refrigerant of the gaseous state, which is in a higher position than that of the liquid state flows into the compressor 230.

An oil separator 241 for separating oil included in the refrigerant discharged from the compressor 230 is provided at an outlet of the compressor 230. The oil separator 241 has a cylindrical shape with a predetermined diameter and separates the oil included in the refrigerant, which is compressed in the inner space of the compressor 230, and discharged from the compressor 230.

Oil for cooling heat generated from friction during the operation of the compressor 230 is provided within the compressor 230 and a part of the oil is mixed with the refrigerant and discharged from the compressor 230. Accordingly, the oil included in the refrigerant discharged from the compressor 230 is separated into oil and refrigerant by passing through the oil separator 241, and the separated oil is again returned into the inner space of the compressor 230.

The oil separator 241 includes a first oil separator 242 for separating oil included in the refrigerant discharged from the inverter compressor 231 and a second oil separator 243 for separating oil included in the refrigerant discharged from the constant velocity compressor 232.

An oil separator check valve 244 preventing backward flow is further included at an outlet of the oil separator 241. The oil separator check valve 244 prevents backflow of the compressed refrigerant into the inner space of the compressor 230, which does not operate when only one of the constant velocity compressor 232 or the inverter compressor 231 operates.

An oil return opening 250 is provided between the constant velocity compressor 232 and the inverter compressor 231 such that the oil of the constant velocity compressor 232 and the inverter compressor 231 are equally received. The oil return opening 250 refills oil through another compressor 230 or the oil separator 241 before an oil shortage occurs in any one compressor 230, thereby preventing damage of the compressors 230 through a lack of oil.

The oil return opening 250 includes oil return pipes 251 and 254, which guide oil separated by the oil separator 241 to return into the same compressor 230 where the corresponding oil was discharged and return uniformly to oil pipes 252 and 255 divided from the oil return pipes to guide oil into another compressor 230, which has not discharged the oil.

The pair of oil return pipes 251 and 254 includes a first oil return pipe 251 and a second oil return pipe 254. The first oil return pipe 251 guides oil separated from the first oil separator 242 for separating the oil included in the refrigerant discharged from the inverter compressor 231 to again return into the inverter compressor 231. The second oil return pipe 254 guides oil separated from the second oil separator 243 for separating the oil included in the refrigerant discharged from the constant velocity compressor 232 to again return into the constant velocity compressor 232.

Also, the pair of pipes for uniform distribution of return oil 252 and 255 includes a first pipe for uniform distribution of return oil 252 and a second pipe for uniform distribution of return oil 255. The first pipe for uniform distribution of return oil 252 guides oil flowing along the first oil return pipe 251 from the first oil separator 242 to flow into the constant velocity compressor 232. The second pipe for uniform distribution of oil 255 guides oil flowing along the second oil return pipe 254 from the second oil separator 243 to flow into the inverter compressor 231.

The first pipe for uniform distribution of return oil 252 is divided from the first oil return pipe 251, and the second pipe for uniform distribution of return oil 255 is divided from the second oil return pipe 254. That is, one end of the first pipe for uniform distribution of return oil 252 is communicated with the first oil return pipe 251, and another end is communicated with the inlet of the constant velocity compressor 232. Also, one end of the second oil return pipe 254 is communicated with the second oil separator 243, and another end is communicated with the inlet of the constant velocity compressor 232.

For a further detailed explanation, the oil included in the refrigerant exchanged from the inverter compressor 231 is separated from the refrigerant by passing through the first oil separator 242, and the oil separated from the refrigerant flows along the first oil return pipe 251. The oil flowing within the first oil return pipe 251 is recycled into the inverter compressor 231 through the inlet of the inverter compressor 231, and a part of the oil is guided by the first pipe for uniform distribution of return oil 252 to flow into the constant velocity compressor 232.

Also, the oil included in the refrigerant exchanged from the constant velocity compressor 232 is separated from the refrigerant by passing through the second oil separator 243, and the oil separated from the refrigerant flows along the second oil return pipe 254. The oil flowing along the second oil return pipe 254 is recycled into the first pipe for uniform distribution of return oil 252 through the inlet of the constant velocity compressor 232, and a part of the oil is guided by the inverter compressor 231 to flow into the inverter compressor 231.

A first return valve 253 controlling the flow of oil by selectively opening and closing the first pipe for uniform distribution of return oil 252 is installed in the first pipe for uniform distribution of return oil 252, and a second return valve 256 controlling the flow of oil by selectively opening and closing the second return uniform oil pipe 255 is installed in the second return uniform oil pipe 256.

The first return valve 253 selectively opens and closes the first pipe for uniform distribution of return oil 252 according to the load capacity of the inverter compressor 231. The first return valve 253 is an electronic valve that can control the amount that it opens. Therefore, the flow volume of the oil is controlled according to the operating capacity of the inverter compressor 231. Also, the second return valve 256 is an electronic valve that controls the amount that it opens.

A pipe for uniform distribution of oil 260 for guiding oil flow when the operation of the compressor 230 is stopped is installed between the inverter compressor 231 and the constant velocity compressor 232. The pipe for uniform distribution of oil 260 includes a first pipe for uniform distribution of oil 261 and a second pipe for uniform distribution of oil 263. The first pipe for uniform distribution of oil 261 guides oil received within the inverter compressor 231 to flow into the constant velocity compressor 232 through the inlet thereof. The second pipe for uniform distribution of oil 263 guides oil received within the constant velocity compressor 232 to flow into the inverter compressor 231 through the inlet thereof.

A first uniform oil valve 262 controlling oil flow by selectively opening and closing the first pipe for uniform distribution of oil 261 is installed in the first pipe for uniform distribution of oil 261, and a second uniform oil valve 264 controlling oil flow by selectively opening and closing the second pipe for uniform distribution of oil 263 is installed in the second pipe for uniform distribution of oil 263. Thus, the oil flowing through the first pipe for uniform distribution of oil 261 and the second pipe for uniform distribution of oil 263 is controlled by the second uniform oil valve 264, and the amount of oil flow can also be controlled.

Surplus oil discharged from oil received in the individual inner space of the first pipe for uniform distribution of oil 261 and the constant velocity compressor 263 can flow into another compressor because the oil is guided by the first pipe for uniform distribution of oil 261 and the second pipe for uniform distribution of oil 263.

The oil separator 241 is communicated with a main refrigerant valve 270 through the pipes. The main valve 270 is a four-way valve. The four-way valve reverses the flow direction of the refrigerant according to an operation mode of the air conditioner. Each of the ports is respectively connected to the second heat exchanger 220, the first heat exchanger 120 and the accumulator 240. Thus, the refrigerant discharged from the constant velocity compressor 232 and the inverter compressor 231 flows into the main refrigerant valve 270.

Meanwhile, a hot gas pipe 272 in which a portion of the refrigerant flowing into the main refrigerant valve 270 can be directly injected into the accumulator 240 is provided between the oil separator 241 and the main refrigerant valve 270.

The hot gas pipe 272 can directly supply high pressure refrigerant discharged from the compressor 230 to the accumulator 240 when a pressure rise of low pressure refrigerant flowing into the accumulator 240 is required during operation of the air conditioner. A hot gas valve 274 serving as a bypass valve is installed in the hot gas pipe 272 to open and close the hot gas pipe 272.

An overcooler 280 is provided at one side of the compressor 230. The overcooler 280 is installed at a predetermined position of the refrigerant pipe 300 connected to the second heat exchanger 220 and the first heat exchanger 120 and is an overcooling means for further cooling refrigerant flowing into the indoor unit 100 through the second heat exchanger 220.

Hereinafter, the flow of oil through the oil return opening will be described in detail.

Figure 3:
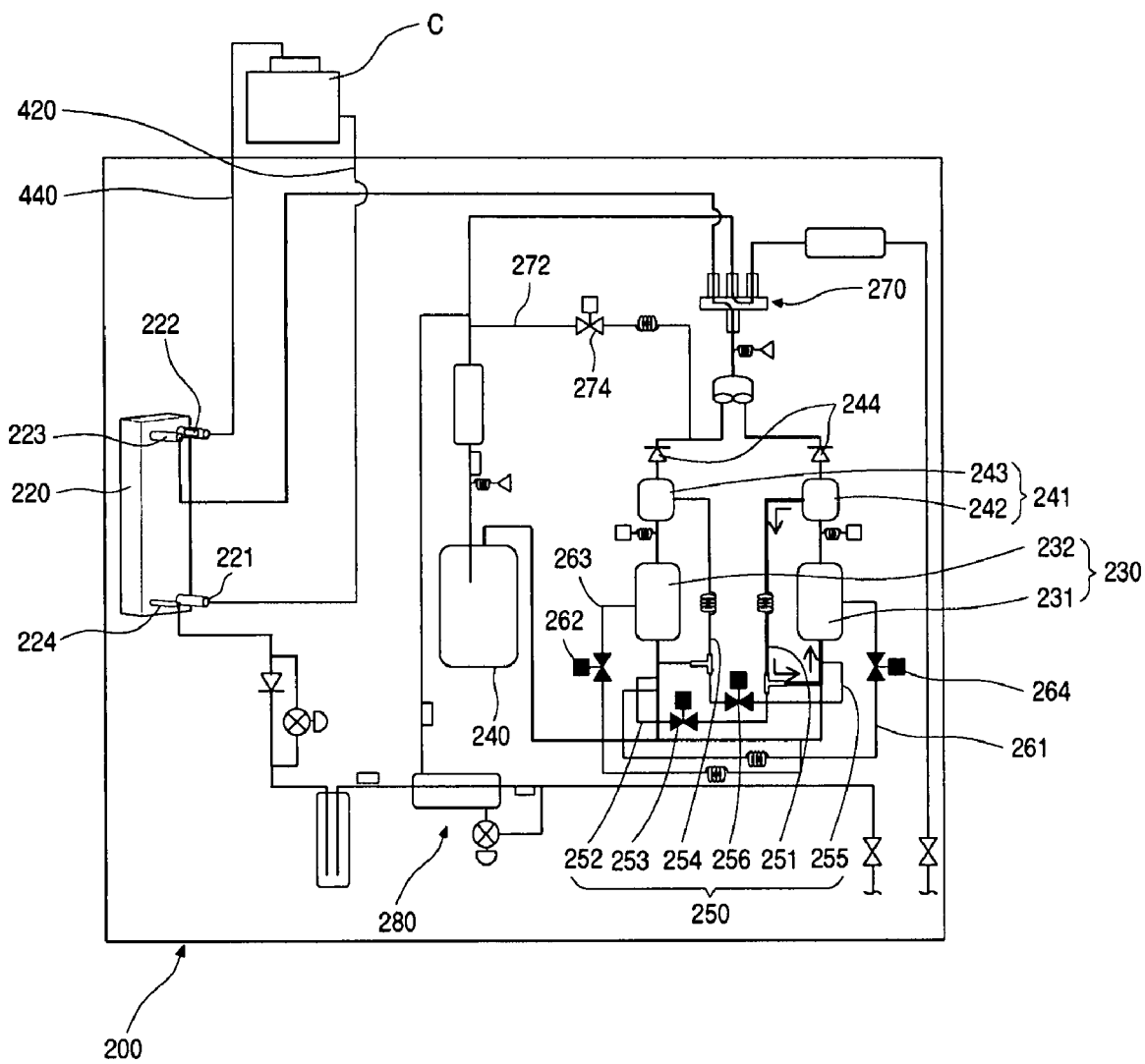
FIG. 3 is a schematic view illustrating flow conditions of oil when an inverter compressor of the air conditioner according to the present invention is operated.

Referring to FIG. 3, oil flow will be described in a state where only the inverter compressor 231 is operated.

Here, refrigerant compressed to a high temperature and a high pressure in the inverter compressor 231 flows into the first oil separator 242, and the refrigerant includes a part of oil.

The first oil separator 242 separates oil from the refrigerant, which is discharged during operation of the inverter compressor 231, and the separated oil is guided through the first oil return pipe 251. The oil guided by the first oil return pipe 251 flows into the inverter compressor 231 through the inlet of the inverter compressor 231.

Here, the first return valve 253 installed in the first pipe for uniform distribution of return oil 252 divided from the first oil return pipe 251 is closed. Thus, the first pipe for uniform distribution of return oil 252 is shielded.

As such, when only the inverter compressor 231 is operated, the oil discharged from the inverter compressor 231 is separated from the refrigerant in the first oil separator 242 and then flows along the first oil return pipe 251 to flow back into the inverter compressor 231. That is, when only the inverter compressor 231 is operated, the oil discharged from the inverter compressor 231 flows back into the inverter compressor 231, thereby preventing a shortage of oil.

Figure 4:
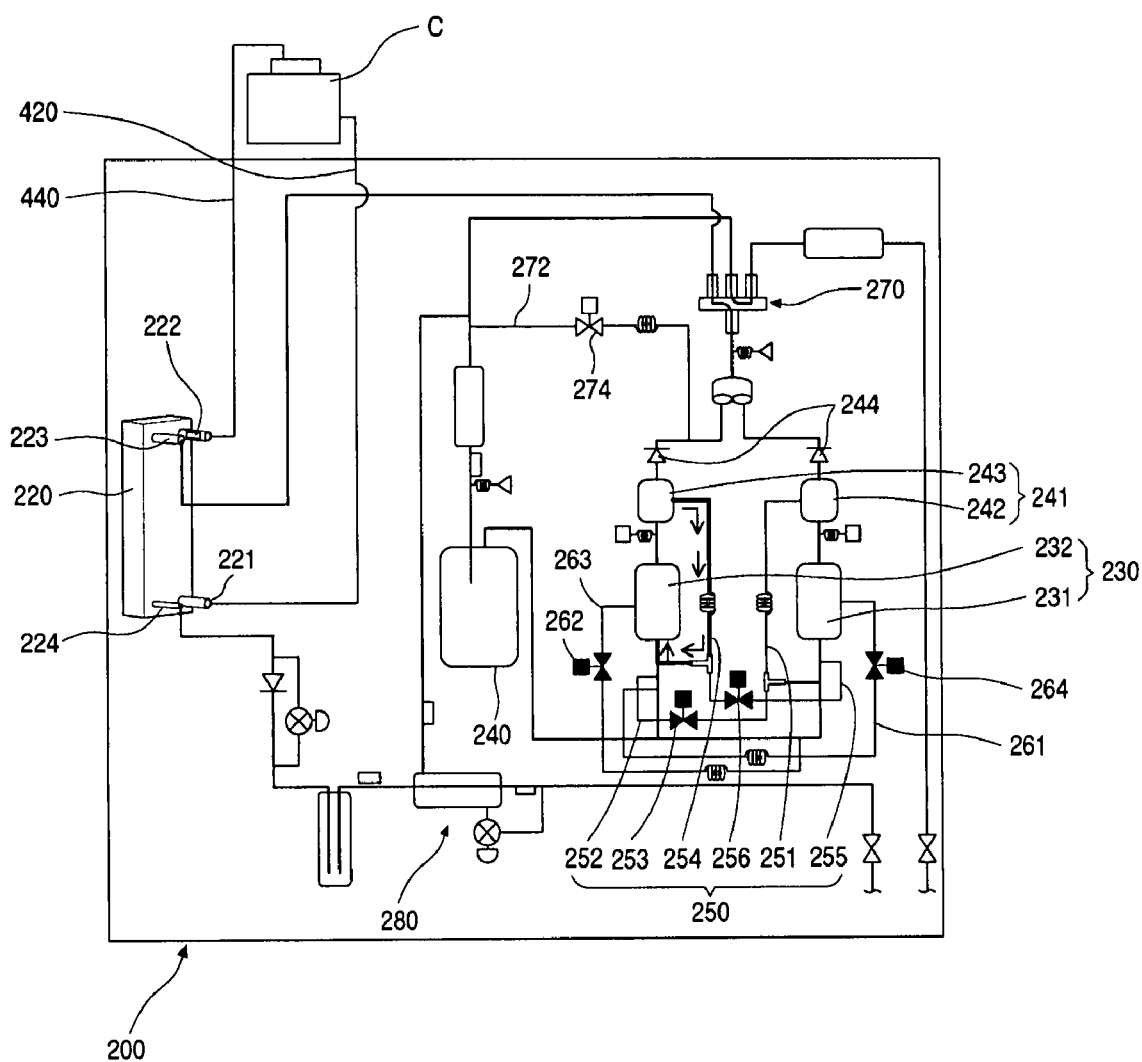
FIG. 4 is a schematic view illustrating flow conditions of oil when a constant velocity compressor of the air conditioner according to the present invention is operated.

Referring to FIG. 4, oil flow will be described in a state in which only the constant velocity compressor 232 is operated.

The oil included in high temperature and pressure refrigerant discharged from the constant velocity compressor 232 is separated from the refrigerant in the second oil separator 243 and guided by the second oil return pipe 254 communicated with the second oil separator 243. The oil guided by the second oil return pipe 254 flows back into the constant velocity compressor 232 through the inlet of the constant velocity compressor 232.

Here, the second return valve 256 installed in the second pipe for uniform distribution of return oil 255 divided from the second oil return pipe 254 is closed. Thus, the second pipe for uniform distribution of return oil 255 is shielded.

As such, when only the constant velocity compressor 232 is operated, the oil discharged from the constant velocity compressor 232 is separated from the refrigerant in the second oil separator 243 and then flows along the second oil return pipe 254 to again flow into the constant velocity compressor 232. That is, when only the constant velocity compressor 232 is operated, the oil discharged from the inverter compressor 231 flows back into the constant velocity compressor 232, thereby preventing the oil shortage in the constant velocity compressor 232.

Figure 5:
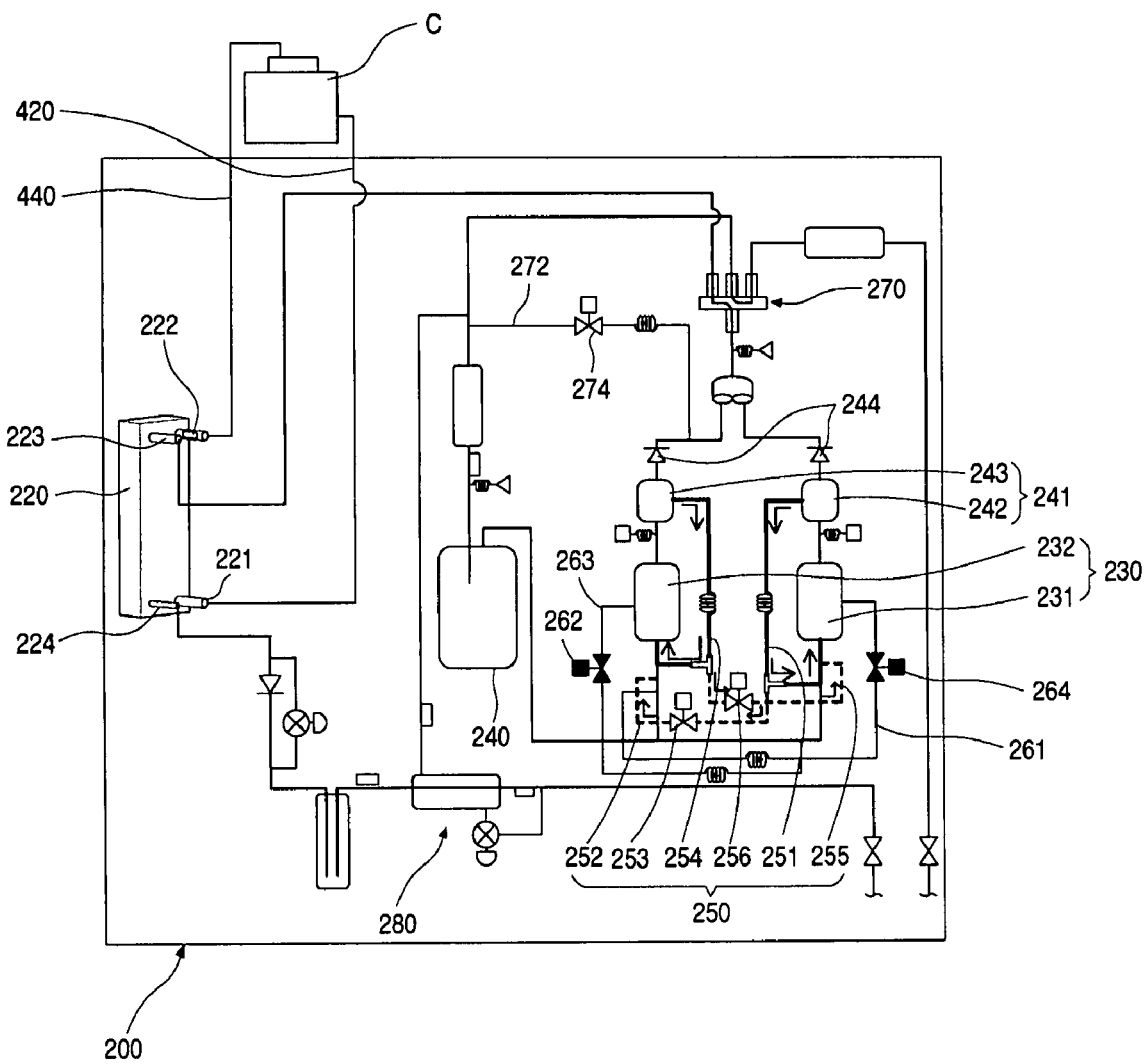
FIG. 5 is a schematic view of an outdoor unit illustrating flow conditions of oil when all compressors of a multi-type air conditioner adapted according to a preferred embodiment of the present invention are operated.

Hereinafter, referring to FIG. 5, oil flow will be described in a state in which the inverter compressor 231 and the constant velocity compressor 232 are operated at the same time when a required load capacity exceeds the capacity of the inverter compressor 231.

When the inverter compressor 231 and the constant velocity compressor 232 are operated at the same time, the oil included in the refrigerant discharged from the inverter compressor 231 is separated from the refrigerant through the first oil separator 242 and then flows along the first oil return pipe 251. The oil included in the refrigerant discharged from the constant velocity compressor 232 is separated from the refrigerant through the second oil separator 243 and then flows along the second oil return pipe 254.

The oil flowing along the first oil return pipe 251 flows into the inlet of the inverter compressor 231, and a portion of the oil flowing along the first oil return pipe 251 flows into the first pipe for uniform distribution of return oil 252 divided from the first oil return pipe 251 and flows into the inlet of the constant velocity compressor 232. That is, the oil flows into the constant velocity compressor 232 through the inverter compressor 252 because the first return valve 253 is opened to open the first pipe for uniform distribution of return oil 252. Thus, a portion of the oil discharged from the inverter compressor 231 is returned to the inverter compressor 231, and another portion of the oil flows into the constant velocity compressor 232.

Also, the oil flowing along the second oil return pipe 254 flows into the inlet of the constant velocity compressor 232, and a portion of the oil flowing along the second oil return pipe 254 flows into the second pipe for uniform distribution of return oil 255 divided from the second oil return pipe 254 and flows into the inlet of the inverter compressor 231. The second return valve 256 is opened to open the second pipe for uniform distribution of return oil 255. Thus, the oil flows into the inverter compressor 231 through the second pipe for uniform distribution of return oil 255.

Therefore, when the inverter compressor 231 and the constant velocity compressor 232 are operated at the same time, the oil discharged from the inverter compressor 231 is returned into the inverter compressor 231, and simultaneously, a portion of the oil flows into the constant velocity compressor 232. And, the oil discharged from the constant velocity compressor 232 is returned into the constant velocity compressor 232, and simultaneously, a portion of the oil flows into the inverter compressor 231.

Here, the first uniform oil valve 262 and the second uniform oil valve 264 installed in the first pipe for uniform distribution of oil 261 and the second pipe for uniform distribution of oil 263, respectively, are not operated.

Also, the first return valve 253 and the second return valve 256 can control an amount of the oil flowing into the first pipe for uniform distribution of return oil 252 and the second pipe for uniform distribution of return oil 255 according to a load capacities of the inverter compressor 231 and the constant velocity compressor 232 by controlling of the amount by which the valve is opened.

Figure 6:
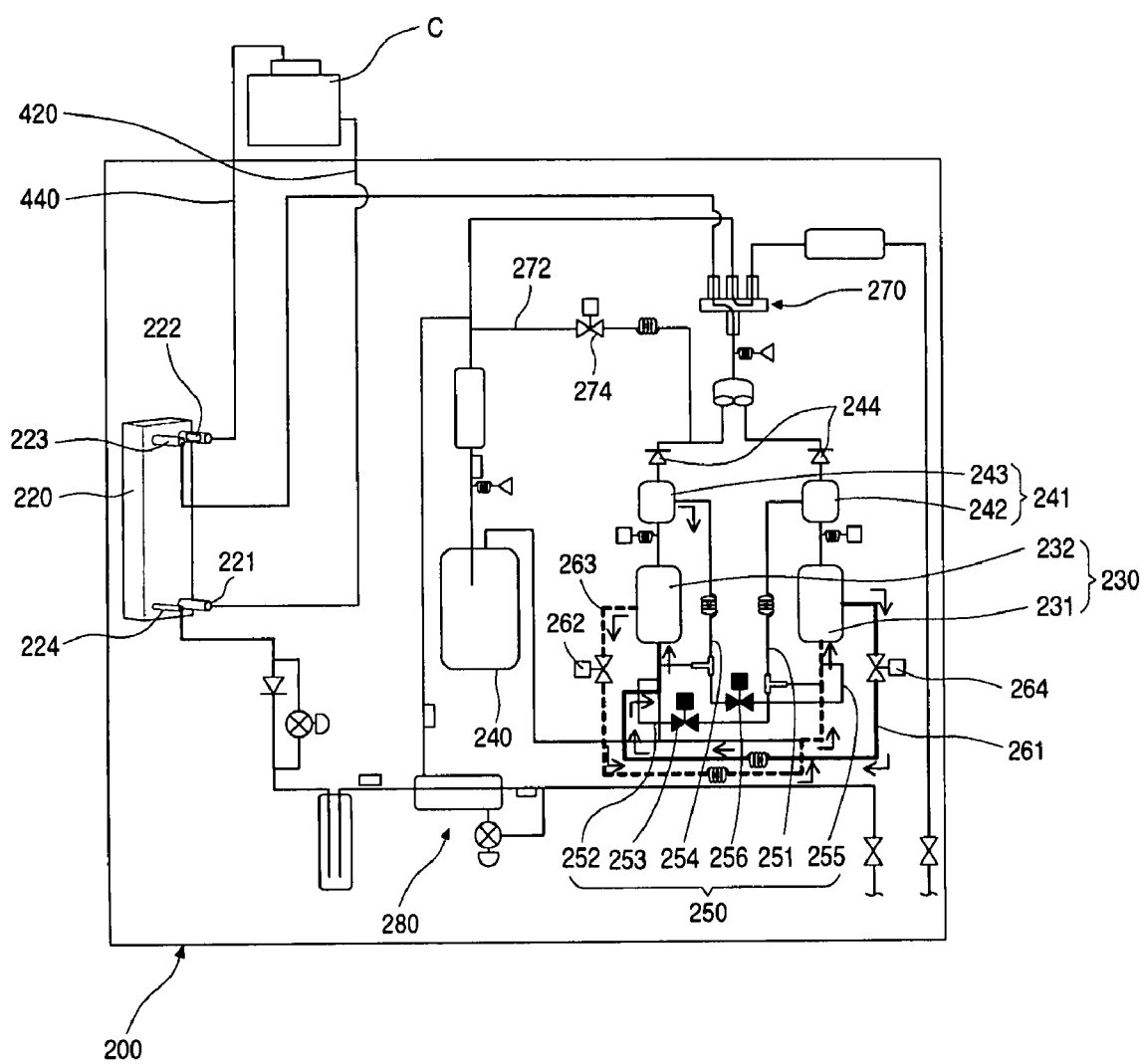
FIG. 6 is a schematic view of an outdoor unit illustrating flow conditions of oil flowing into a pipe for uniform distribution of oil, which is a main component of a multi-type air conditioner according to a preferred embodiment of the present invention.

Referring to FIG. 6, a flow of oil will be described in a state in which the operation of the compressor 230 is stopped. That is, oil flow through the first pipe for uniform distribution of oil 261 and the second pipe for uniform distribution of oil 263 will be described in a state in which the operation of the compressor 230 is stopped.

When the operation of a pair of compressors 230 is stopped, the first return valve 253 installed in the first pipe for uniform distribution of return oil 252 and the second return valve 256 installed in the second pipe for uniform distribution of return oil 255 are closed. Accordingly, the first pipe for uniform distribution of return oil 252 and the second pipe for uniform distribution of return oil 255 are shielded.

Meanwhile, here, the first uniform oil valve 262 installed in the first pipe for uniform distribution of oil 261 and the second uniform oil valve 264 installed in the second pipe for uniform distribution of oil 263 are opened. Accordingly, the first pipe for uniform distribution of oil 261 and the second pipe for uniform distribution of oil 263 are opened.

Thus, the oil received in the inverter compressor 231 is guided by the pipe for uniform distribution of oil 261 to flow into the inlet of the constant velocity compressor 232, and the oil received within the constant velocity compressor 232 is guided by the second pipe for uniform distribution of oil 263 to flow into the inlet of the inverter compressor 231.

Thus, the oil received in the inverter compressor 231 and the constant velocity compressor 232 through the first pipe for uniform distribution of oil 261 and the second pipe for uniform distribution of oil 263 can flow together. Therefore, the oil pressures within each of the pair of compressors 230 are equal.

By repeatedly performing such an operation, the oil more rapidly flows into each of the compressors 230 and can be selectively supplied according to an amount of oil required for each of the compressor 230, thereby preventing damage due to an oil shortage in the compressor 230. That is, oil flow among a plurality of compressors 230 is possible, and also, oil discharged from a compressor of one side can directly flow into a compressor of another side, thereby effectively preventing compressor damage due to the oil shortage.

Hereinafter, an operation of a water cooled air conditioner as described above will be described with reference to FIG. 1.

The operation of a multi-type water cooled air conditioner in heating mode to heat an indoor space will be described below.

A user connects an external power supply for operating the air conditioner. When the external power is supplied, the compressor 230 is operated by the power supply.

When the compressor 230 is operated, refrigerant is changed to a gaseous state with a high temperature and a high pressure through the operation of the compressor 230. The refrigerant changed to the gaseous state with the high temperature and pressure flows into the oil separator 241. The refrigerant separated in the oil separator 241 flows into the main refrigerant valve 270 to pass through the main refrigerant valve 270.

The refrigerant passing through the main refrigerant valve 270 flows along a pipe connected to one port among ports of the main refrigerant valve 270 to flow into the first heat exchanger 120 installed in an inner space of the indoor unit 100. The refrigerant flowing into the first heat exchanger 120 exchanges heat with air for conditioning air when the air for the air conditioning suctioned into the inner space of the indoor unit 100 passes through the first heat exchanger 120.

The air of the indoor space, which is heat exchanged with high temperature, and pressurized refrigerant in the first heat exchanger 120 is heat exchanged to a high temperature and re-injected into the indoor space, thereby heating the indoor space.

The refrigerant passing through the first heat exchanger 120 is heat exchanged with the air for conditioning the air, and phase-transforms into a liquid state with low temperature and pressure. The refrigerant phase-transformed into the liquid state with the low temperature and pressure passes through the expansion valve 140 installed in the inner space of the indoor unit 100 to flow along the refrigerant pipe 300, and then passes through the overcooler 280 to flow into the second heat exchanger 220.

The refrigerant flowing into the second heat exchanger 220 is heat exchanged with water to phase-transform the refrigerant into a gaseous state with a high temperature and a low pressure, and the refrigerant phase-transformed into the gaseous state with the high temperature and the low pressure flows into the main refrigerant valve 270 through a pipe connected to one port formed at the main refrigerant valve 270.

The refrigerant flowing into the main refrigerant valve 270 flows into the accumulator 240 and flows back into the compressor 230. The refrigerant flowing into the compressor 230 is compressed within the compressor 230 to complete one cycle of operation.

The operation of cooling an indoor space according to refrigerant flow when a multi-type water cooled air conditioner is operated in a cooling mode will be described below.

The compressor 230 is operated by supplying an external power supply. When the compressor 230 is operated, refrigerant is changed to a gaseous state with a high temperature and a high pressure through the operation of the compressor 230. The refrigerant changed to the gaseous state with the high temperature and pressure flows into the oil separator 241. The refrigerant separated in the oil separator 241 flows into the main refrigerant valve 270 to pass through the main refrigerant valve 270.

The refrigerant passing through the main refrigerant valve 270 flows along a pipe connected to one port among ports of the main refrigerant valve 270 to flow into an inner space of the second heat exchanger 220. The refrigerant flowing into the second heat exchanger 220 is heat exchanged with water supplied from the cooling tower C in the inner space of the second heat exchanger 220.

The refrigerant heat exchanged in the inner space of the second heat exchanger 220 is phase-transformed into a liquid state with a low temperature and a high pressure, and the refrigerant phase-transformed into the liquid state with the low temperature and the high pressure is over-cooled by passing through the overcooler 280. The over-cooled refrigerant transforms to a liquid state with low temperature and pressure by passing through the expansion valve 140 installed in the inner space of the indoor unit 100. The refrigerant having the liquid state of the low temperature and pressure is heat exchanged with air injected from inside the indoor unit 100 by passing through the first heat exchanger 120.

Air of the inner space and the a low temperature refrigerant flowing inside of the first heat exchanger 120 exchange heat in the first heat exchanger 120. The air of the inner space, which exchanges heat with the low temperature refrigerant has a low temperature and the low temperature air is re-injected into the inner space, thereby cooling the inner space.

The refrigerant heat exchanged with the air of the inner space is phase-transformed into a gas state with high temperature and pressure, and the phase-transformed refrigerant is guided by the refrigerant pipe 300 to pass through the main refrigerant valve 270 through one port of the main refrigerant valve 270. The refrigerant passing through the main refrigerant valve 270 is separated into liquid refrigerant and gas refrigerant by passing through the accumulator 240.

The gas refrigerant separated through the accumulator 240 flows into the inner space of the compressor 230 and is again compressed into a gaseous state with high temperature and pressure to complete one cycle of operation.

The invention may be embodied in many different forms and should not be construed as being limited to the embodiments set forth herein; rather, these embodiments are provided so that this disclosure will be thorough and complete, and will fully convey the concept of the invention to those skilled in the art.

What is claimed is:

1. An air conditioner comprising:
    a first heat exchanger for performing heat exchange between air of an indoor space and refrigerant to condition the air;
    a second heat exchanger connected to the first heat exchanger through a pipe, for performing heat exchange between the refrigerant and water;
    a constant velocity compressor operating at a constant velocity, for compressing the refrigerant to a high temperature and a high pressure;
    an inverter compressor operating variably according to a load capacity, for compressing the refrigerant to a high temperature and a high pressure;
    a first pipe for uniform distribution of oil, for guiding a flow of oil from within the inverter compressor into the constant velocity compressor;
    a second pipe for uniform distribution of oil, for guiding a flow of oil from within the constant velocity compressor into the inverter compressor;
    a first oil separator provided at an outlet of the inverter compressor, for separating oil included in refrigerant discharged from the inverter compressor;
    a second oil separator provided at an outlet of the constant velocity compressor, for separating oil included in refrigerant discharged from the constant velocity compressor; and
    an oil return opening for guiding the oil separated by each of the oil separators to flow into at least one of the constant velocity compressor and the inverter compressor,
    wherein the oil return opening includes:
    a first oil return pipe for guiding oil separated by the first oil separator to return to the inverter compressor;
    a second oil return pipe for guiding oil separated by the second oil separator to return to the constant velocity compressor;
    a first return uniform oil pipe divided from the first oil return pipe, for guiding the oil separated by the first oil separator to flow into the constant velocity compressor;
    a second return uniform oil pipe divided from the second oil return pipe, for guiding the oil separated by the second oil separator to flow into the inverter compressor;
    a plurality of valves respectively installed in the first return uniform oil pipe and the second return uniform oil pipe, so that the valves can continuously control the volume of the oil to flow into the compressor according to the operating capacity of the compressor,
    and wherein the oil included in refrigerant discharged from the inverter compressor flows through the first oil return pipe and the first return uniform oil pipe without mixing with the oil included in refrigerant discharged from the constant velocity compressor, and the oil included in refrigerant discharged from the constant velocity compressor flows through the second oil return pipe and the second return uniform oil pipe without mixing with the oil included in refrigerant discharged from the inverter compressor.

2. The air conditioner according to claim 1, wherein when only one of the constant velocity compressor and the inverter compressor is operating, the oil return opening guides the oil separated and returned from the first oil separator and second oil separator into the one operating compressor.

3. The air conditioner according to claim 1, wherein when the constant velocity compressor and the inverter compressor are all operating, the oil return opening guides oil returned through any one of the first oil separator and second oil separator to flow into all of the compressors.

4. The air conditioner according to claim 1, wherein when the constant velocity compressor and the inverter compressor are all operating, the first pipe for uniform distribution of oil and the second pipe for uniform distribution of oil are shielded to prevent oil flow therethrough.

5. The air conditioner according to claim 1, wherein the first pipe for uniform distribution of oil and the second pipe for uniform distribution of oil are opened to guide oil flow, when the constant velocity compressor and the inverter compressor all stop operating.

6. The air conditioner according to claim 1, wherein each of the first pipe and the second pipe for uniform distribution of oil include a valve, for selectively opening and closing the respective first pipe and the second pipe.

7. The air conditioner according to claim 1, wherein the constant velocity compressor is operated when a load that the inverter compressor cannot handle is placed on the inverter compressor.

8. The air conditioner according to claim 1, wherein the plurality of valves include:
a first return valve installed in the first return uniform oil pipe for uniform distribution of return oil, so that the first return valve can control the volume of the oil to flow into the constant velocity compressor according to the operating capacity of the inverter compressor; and
a second return valve installed in the second return uniform oil pipe for uniform distribution of the return oil, so that the second return valve can control the volume of the oil to flow into the inverter compressor according to the operating capacity of the inverter compressor.

* * * * *